United States Patent
Riché, Jr. et al.

(10) Patent No.: US 12,018,701 B2
(45) Date of Patent: Jun. 25, 2024

(54) HYDRAULIC BEARINGS AND RELATED DEVICES, ASSEMBLIES, AND METHODS

(71) Applicant: Flowserve Pte Ltd., Singapore (SG)

(72) Inventors: Chris J Riché, Jr., Murrieta, CA (US); Scott Judge, Bethlehem, PA (US)

(73) Assignee: FLOWSERVE PTE. LTD., Singapore (SG)

( * ) Notice: Subject to any disclaimer, the term of this patent is extended or adjusted under 35 U.S.C. 154(b) by 391 days.

(21) Appl. No.: 17/031,736

(22) Filed: Sep. 24, 2020

(65) Prior Publication Data

US 2022/0090629 A1    Mar. 24, 2022

(51) Int. Cl.
| | |
|---|---|
| *F04F 13/00* | (2009.01) |
| *F16C 17/02* | (2006.01) |
| *F16C 17/04* | (2006.01) |
| *F16C 32/06* | (2006.01) |

(52) U.S. Cl.
CPC ............ *F04F 13/00* (2013.01); *F16C 17/026* (2013.01); *F16C 17/045* (2013.01); *F16C 32/0644* (2013.01); *F16C 32/0659* (2013.01)

(58) Field of Classification Search
CPC ....... F04F 13/00; F16C 29/025; F16C 17/026; F16C 32/0644; F16C 32/0659; F16C 2360/00; F16C 17/02; F16C 33/107; F16C 17/045

See application file for complete search history.

(56) References Cited

U.S. PATENT DOCUMENTS

| | | | | |
|---|---|---|---|---|
| 4,427,872 | A | | 1/1984 | Saunders |
| 5,000,584 | A | * | 3/1991 | Simmons ............ F16C 32/0659 |
| | | | | 384/114 |
| 5,181,783 | A | * | 1/1993 | Sherman ............ F16C 33/1065 |
| | | | | 384/114 |
| 6,318,896 | B1 | * | 11/2001 | Meng .................. F16C 32/0659 |
| | | | | 384/114 |
| 8,250,757 | B2 | | 8/2012 | Young |
| 9,383,017 | B2 | | 7/2016 | Young et al. |
| 10,125,796 | B2 | | 11/2018 | Hauge |
| 2002/0025264 | A1 | | 2/2002 | Polizos et al. |
| 2005/0175263 | A1 | * | 8/2005 | Nanbu ................ F16C 33/1075 |
| | | | | 384/12 |
| 2006/0291757 | A1 | * | 12/2006 | LeBlanc ............ F16C 33/1085 |
| | | | | 384/107 |
| 2016/0138649 | A1 | | 5/2016 | Anderson et al. |

(Continued)

FOREIGN PATENT DOCUMENTS

| | | | |
|---|---|---|---|
| GB | 1121761 | * | 7/1968 |
| SU | 241829 A | | 8/1969 |

(Continued)

OTHER PUBLICATIONS

International Search Report and Written Opinion for PCT/US2021/048627, dated Oct. 28, 2021, 8 pages.

*Primary Examiner* — Charles G Freay
(74) *Attorney, Agent, or Firm* — BKRIP LLC

(57) ABSTRACT

Devices and method include relatively moving elements having one or more bearing surfaces defining a gap between the elements into which a fluid is received. At least one of the bearing surfaces comprises a varying topography to provide pressurized volumes of the fluid in order to define a hydraulic bearing to support at least one of the elements during movement.

20 Claims, 6 Drawing Sheets

(56) References Cited

U.S. PATENT DOCUMENTS

| | | | |
|---|---|---|---|
| 2016/0160890 A1* | 6/2016 | Anderson | F15B 15/063 |
| | | | 92/61 |
| 2016/0195139 A1* | 7/2016 | Inoue | F16J 15/3412 |
| | | | 384/138 |
| 2017/0074319 A1* | 3/2017 | Sydnor | F16C 32/0614 |
| 2017/0102031 A1 | 4/2017 | Potze et al. | |
| 2019/0293118 A1* | 9/2019 | Anderson | F16C 32/06 |
| 2020/0141444 A1* | 5/2020 | Thatte | F16C 17/08 |

FOREIGN PATENT DOCUMENTS

| | | |
|---|---|---|
| SU | 372385 A | 4/1973 |
| WO | WO 2008/042693 A1 | 4/2008 |
| WO | WO 2015/103405 A2 | 7/2015 |
| WO | WO 2015/176861 A1 | 11/2015 |

\* cited by examiner

HYDRAULIC BEARINGS AND RELATED DEVICES, ASSEMBLIES, AND METHODS

TECHNICAL FIELD

The present disclosure relates generally to hydraulic bearings for devices, such as fluid handling devices. More particularly, embodiments of the present disclosure relate to one or more surfaces that have been provided with topography configured to define a hydraulic bearings (e.g., hydrodynamic and/or hydrostatic bearings) for bearing and/or supporting one or more applied forces (e.g., by creating a load bearing supporting force). as elements of the device move in relation to one another in devices, such as fluid handling devices, and related devices, assemblies, and methods.

BACKGROUND

Hydrodynamic bearings are often used when bearings are exposed to demanding performance conditions. In a hydrodynamic bearing, a gap or clearance between one or more moving parts is defined. The gap enables some type of fluid to be positioned between the elements (e.g., between two elements that are movable relative to each other, such as a rotor and a stator). For example, as a rotor is rotated, fluid may fill into (e.g., be forced into) the gap between the elements. In response to relative motion between the parts, pressure is generated in the fluid, which may establish a pumping action.

One device in which hydrodynamic bearings may be utilized is a fluid-handling device, such as a rotary pressure exchanger for transfer of pressure energy from one fluid to another. Such pressure exchangers are designed with a rotor being rotated by the fluid streams. The flow driven designs use either a sleeve or a central axle for positioning of the rotor between two pairs of end covers. Such rotary pressure exchangers may be utilized as an energy recovery device in processes such as seawater reverse osmosis processes, fracking processes, etc.

Devices, such as a rotary pressure exchanger with a rotor on a stationary shaft supported on bearing surfaces typically require a relatively small clearance and smooth surface finish on the bearing surfaces to spread out the weight of the rotor while generating low friction. However, such devices can be difficult to manufacture as manufacturing such relatively small clearances is difficult and generally requires matching machined parts to maintain optimal reliability, especially in relatively larger matching parts. Further, in order to provide for movement of the rotor, a pressure differential (e.g., a pressure drop) may be required where the pressure of the fluid breaks down through flow across the clearance between the bearing surfaces. However, bearings defined with such a pressure drop often reduce efficiency of the device.

BRIEF SUMMARY

Various embodiments may include a device for exchanging pressure between at least two fluid streams. The device includes a rotor comprising fluid channels and one or more end covers positioned at one or more axial ends of the rotor. A fluid inlet and a fluid outlet may be defined in the one or more end covers to provide fluid into or out of the fluid channels. In some embodiments, the device may further comprise an axle about which the rotor is disposed and a housing radially encompassing at least the rotor. The rotor is configured to rotate relative to at least one of the axle or the housing. The device further comprises bearing surfaces defined between the rotor and at least one of an axially-aligned surface of the axle, an axially-aligned surface of the housing, or one or more radially-aligned surfaces of the one or more end covers. At least one of the bearing surfaces comprises a varying topography including one or more discrete recesses for holding pressurized fluid in order to define a hydraulic bearing to support the rotor as the rotor moves relative to at least one of the axle, the housing, or the one or more end covers.

Another embodiment may include a device including one or more hydraulic bearings. The device comprises a first element and a second element being movable relative to the first element. The first element and the second element define a gap between the first element and the second element and the gap is configured to receive a fluid in the gap when the second element is being moved relative (e.g., rotated relative) to the first element. The device further comprises bearing surfaces defined between the first element and the second element on opposing sides of the gap. At least one of the bearing surfaces comprises a varying topography of one or more recesses to provide pressurized volumes of the fluid in order to define a hydraulic bearing to support at least one of the first element or the second element as the second element is being moved relative to the first element.

Another embodiment may include a method of forming a hydraulic bearing. The method comprises rotating a rotor about an axis of a device; directing a fluid into an interface between the rotor and at least one of a housing at least partially enclosing the rotor, an axle about which the rotor rotates, or one or more end covers positioned at one or more axial ends of the rotor of the device; displacing bearing surfaces at the interface relative to one another, the bearing surfaces defined between the rotor and at least one of an axially-aligned surface of the axle, an axially-aligned surface of the housing, or one or more radially-aligned surfaces of the one or more end covers; supplying the fluid in the interface to at least one of the bearing surfaces comprising a varying topography comprising one or more recesses; and pressuring at least a portion of the fluid as the fluid exits the one or more recesses in the at least one of the bearing surfaces comprising the varying topography in order to define a hydraulic bearing to support the rotor is rotated.

Another embodiment may include a method of forming a hydraulic bearing. The method comprises rotating a rotor about an axis of a device; directing a fluid into an interface between the rotor and another component of the device; displacing bearing surfaces at the interface relative to one another, the bearing surfaces defined between the rotor and at least one of an axially-aligned surface of the another component or a radially-aligned surface of the another component; and supplying the fluid in the interface to at least one of the bearing surfaces comprising a varying topography of one or more micro-recesses in order to define a hydraulic bearing to support the rotor.

Another embodiment may include a method of forming a hydraulic bearing. The method comprises moving a first element relative to a second element, defining a gap between the first element and the second element, receiving fluid in the gap when the second element is being moved relative to the first element; and defining a hydraulic bearing with bearing surfaces defined between the first element and the second element on opposing sides of the gap, at least one of the bearing surfaces comprising a varying topography of discrete recess to provide pressurized volumes of the fluid to support at least one of the first element or the second element as the second element is being moved relative to the first element.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
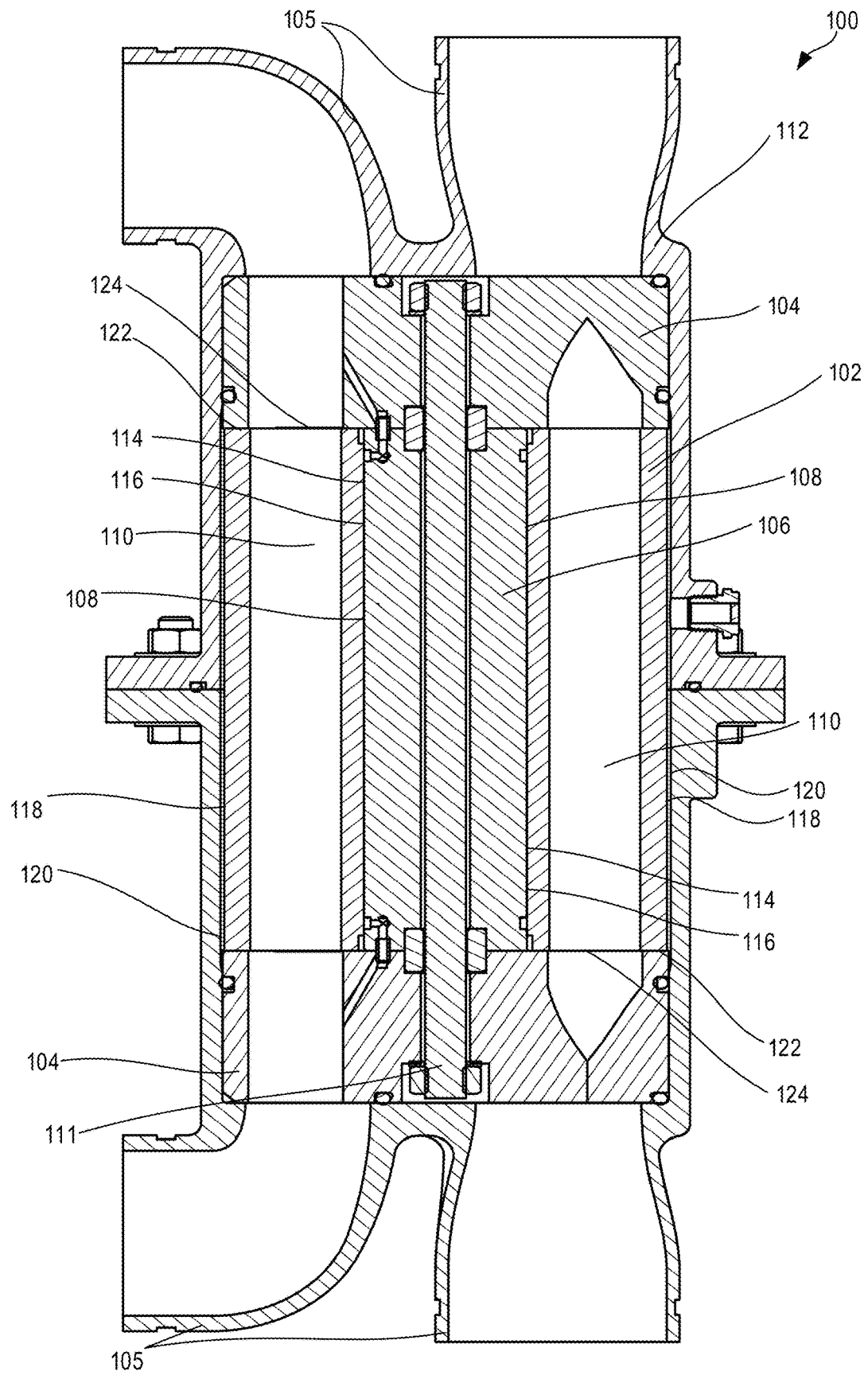
FIG. 1 is a cross-sectional view of a device (e.g., a work exchanger, such as a pressure exchanger) in accordance with an embodiment of the disclosure.

The illustrations presented herein are not meant to be actual views of any particular device, assembly, system, or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

While embodiments of the present disclosure specifically discuss hydraulic bearings that may be utilized with fluid-handling devices, such as exchangers (e.g., work exchangers) for transferring one or more characteristics of a fluid stream to another fluid stream, the hydraulic bearings discussed herein, and in accordance with embodiments of the disclosure, may be utilized in any other device having one component that moves relative to another component with a fluid provided between the relatively-movable elements. In some embodiments, such devices may include, for example, actuators, pumps, gearboxes, blowers, fans, compressors, etc.

Embodiments of the present disclosure may reduce the need for a relatively large or long, close-clearance fits between bearing surfaces by providing one or more of the bearing surfaces with a topography (e.g., non-planar, irregular, and/or discontinuous surface features) that enable, relatively smaller, low-tolerance bearing spans, while still providing low friction operation to relatively movable components, such as a rotor and axle assembly of a pressure exchanging device. In some embodiments, such surface features may be defined on the bearing surfaces through laser-machining processes, such as, for example, those disclosed in U.S. Pat. No. 8,250,757, the disclosure of which is incorporated herein in its entirety by reference.

Such surface features on the bearing surfaces may only require movement (e.g., rotation and/or translation) between the elements to create a load-carrying pressure film, rather than flow or differential pressure from one side to the other as in a pressure differential configuration. Fluid (e.g., liquid) pressure from the device may be used to fill the gap between the relatively-movable components, such as an axle and a rotor, and interfaces between the rotor and axle and is used as the working fluid in the surface features. In such a configuration, little to no fluid flow may be needed. Rather, only the pressurization of the fluid to provide bearing of the loads between the element may be utilized, which configuration may enhance efficiency of the device.

Features on one or more of the bearing surfaces may act to reduce the bearing span needed by creating pockets of higher pressure due to the relative movement (e.g., rotation, translation) of the elements. While such pockets in the bearing surface may be relatively small (e.g., on the scale of microinches, microns, etc.), the pockets may collectively provide a relatively large pressure in order to create a relatively larger supporting force for the bearing surface in a relatively shorter overall surface area. Such a configuration may be especially useful where a relatively long bearing span may be difficult to maintain, such as in a small bore or along a large axial distance between the rotor and housing and/or axle of a pressure exchanger.

As noted above, in some embodiments, such bearing surface features may be machined using laser technology and may include recesses of microinch depths with tapered surface leading into and out of the recesses in one or more directions (e.g., along a direction of intended travel of the elements relative to one another). In some embodiments, such bearing surface features may be defined to provide a pumping feature that controls flow of the fluid in the volume between the bearing surfaces (e.g., draws the fluid into the volume between the bearing surfaces). Such pumping features, which may be provided by recesses (e.g., tapered recesses) in the bearing surfaces may reducing the loss of pressure between bearing surfaces (e.g., by reducing the amount of flow therebetween).

As discussed above and below, such topography may define one or more radial bearings and may be provided on axially-aligned surfaces or faces (e.g., bordering surfaces that extend at least partially along an axial direction) that move (e.g., rotate relative to another) to support loads experienced by the rotation. In some embodiments, the topography may provide a pumping action to circulate fluid between the bearing surfaces.

In additional embodiments, such topography may define one or more axial bearings and may be provided on radially-aligned surfaces or faces (e.g., bordering surfaces that extend at least partially along a radial direction). For example, bearing surface features may be applied on end-plates or end covers of a pressure exchanger, which border the rotor on axial ends of the rotor, where minimal recirculation flow between two different pressures may be required to maintain efficiency.

In conventional configurations, a controlled gap is defined by making the axle slightly longer than the rotor. This gap is subject to wear and the rotor can still slide axially and contact the endplates on one side and damage the sealing surface. Such a gap is generally relatively small to prevent recirculation, but also large enough to prevent contact and wear. Embodiments of the disclosure may minimize such problems by providing features on these surfaces that may create high pressure pockets to minimize or even prevent contact, while still controlling leakage using a relatively small axial gap. In some embodiments, the pumping action may act to raise the rotor, thereby preventing contact between the rotor and the stator (e.g., may act as a thrust bearing).

In some embodiments, and as discussed below, end covers of the device may be movable relative to the rotor and/or axle under hydraulic loads. Applying the surface features on radial faces may be utilized to create bearings to carry axial loads due to hydraulic pressure differential on the rotor and the pressure from those bearings may act to displace the end covers to provide a desired clearance during operation.

FIG. 1 illustrates a schematic cross-sectional view of a device including hydraulic bearings, such as a pressure exchange device 100. The hydraulic bearings may include hydrodynamic bearings defined or formed by pressurized and/or moving fluid and/or hydrostatic bearing defined or formed by externally pressurized fluid (e.g., pressurized by a pump). In some embodiments, the pressure exchange device 100 may be similar to that disclosed in, for example, those disclosed in U.S. Pat. No. 10,125,796, the disclosure of which is incorporated herein in its entirety by reference.

As depicted, the pressure exchange device 100 includes a rotor 102 axially bordered by end covers 104. High-pressure and low-pressure inlets and outlets 105 may be defined in the end covers 104 for transferring fluid into the device 100 to be pressured or depressurized and moving the fluid back out of the device 100. The rotor 102 may extend around an axle 106 around which the rotor 102 rotates. In some embodiments, a tension rod 111 may hold the rotor 102 and the end covers 104 together as an assembly. In some embodiments, the end covers 104, rotor 102, and/or axle 106 may be made of a corrosion-resistant material, such as a ceramic material.

The rotor 102 includes a central bore 108 in which the axle 106 is received. The rotor 102 includes one or more ducts or channels 110 for receiving fluid. When the channels 110 are selectively aligned with the high-pressure and low-pressure fluid inlet and outlets 105 in the end covers 104, the fluid entering through one port in the end cover 104 may displace the fluid in the aligned channel or channels 110 through a portion in the opposite end cover 104. In operation, pressure and/or fluid communication in the channels 110 enables the pressure exchange between fluids stream within the channels 110 of the rotor 102.

The rotor 102 and the axle 106 may be disposed in housing 112. As depicted, the end covers 104 may be positioned within two coupling portions of the housing 112 (e.g., two axial end portions that meet at the middle of the device 100). For example, the housing 112 may radially encompass at least a portion of the rotor 102 and the end covers 104 and may enclose the axial ends of the assembly of the rotor 102 and the end covers 104. In additional embodiments, the end covers 104 may define a portion of the housing 112 (e.g., axial ends of the housing 112). For example, the housing 112 may radially encompass at least a portion of the rotor 102 while the end covers 104 enclose the axial ends or faces of the rotor 102.

As depicted, the inlets and outlets 105 may extend through the ends covers 104 and through the axial ends of the housing 112. In some embodiments, the end covers 104 may be coupled to the axle 106 with the central rod 111 that holds the axle 106 and end covers 104 in a fixed position while the rotor 102 rotates about the axle 106.

In operation, a first fluid stream may be supplied to the pressure exchange device 100 into an inlet in one of the end covers 104 and into the channels 110 in the rotor 102. As the rotor 102 rotates, the channels 110 are positioned in selective communication with inlet 105 enabling at least a portion of the fluid to pass into the channels 110. Fluid from the channels 110 may exit the channels 110 (e.g., may be forced out by the fluid supplied to channels 110) through an outlet 105 in an opposing end cover 104.

A second fluid stream is supplied to the pressure exchange device 100 through an inlet 105 in the opposing end cover 104 (e.g., simultaneously with the first fluid stream being supplied to the end cover 104). As the rotor 102 rotates, the second fluid stream is positioned in selective communication with one or more channels 110 enabling at least a portion of the fluid to pass into the channels 110. As above, fluid from the channels 110 may exit the channels 110 (e.g., may be forced out by the fluid supplied to channels 110 as discussed above) through an outlet 105 in the end cover 104.

When the pressure exchange device 100 discussed herein is implemented as a pressure exchanger, high-pressure fluid may be supplied through a first fluid stream to the pressure exchanger 100. The rotor 102 selectively supplies the high-pressure fluid into one or more channels 110. Low-pressure fluid (e.g., to be pressurized) is supplied or that has been previously supplied to channels 110 may be pressurized by the high-pressure fluid and the now pressurized fluid previously within the channels 110 may be at least partially expelled from the channels 110.

As the rotor 102 rotates, the low-pressure fluid (e.g., to be pressurized) may be supplied to channels 110, through the cavity of the end cover 104. The high-pressure fluid that was previously supplied to the channels 110, as above, is positioned in the channels 110 at a relatively lower pressure as this spent fluid has already been used to pressurize the low-pressure fluid supplied to the channels 110. This spent fluid may be at least partially expelled from the channels 110 and may pass through the end cover 104 and may exit the pressure exchange device 100. The process repeats in a similar manner to supply fluid, pressurize the fluid, and then expel the pressurized and spent fluid.

As the rotor 102 of the pressure exchange device 100 rotates the rotor 102 is supported by bearing surfaces defined between one or more surfaces of the rotor 102 and one or more surfaces of adjacent elements (e.g., a first element that moves relative to a second element). For example, an inner bearing surface 114 of the rotor 102 (e.g., an axially extending surface extending about a longitudinal axis or centerline of the rotor 102) may bear upon and be supported by a hydraulic bearing (e.g., a hydrodynamic bearing) defined at an axial interface (e.g., a gap or opening positioned and extending along the axial direction of the rotor 102) between the inner bearing surface 114 and an outer bearing surface 116 of an adjacent element (e.g., the axle 106).

By way of further example, an inner bearing surface 118 of the housing 112 (e.g., an axially extending surface extending about a longitudinal axis or centerline of the housing 112 and/or the rotor 102) may support an outer bearing surface 120 of the rotor 102 with a hydrodynamic bearing defined at another axial interface between the inner bearing surface 118 and an outer bearing surface 120 of the rotor 102 (e.g., a gap or opening positioned and extending along the axial direction of the housing 112 and/or the rotor 102).

While multiple bearing surfaces (e.g., bearing surfaces 114, 116, 118, 120) are discussed herein as potential areas to support a moving component (e.g., the rotor 102), in some embodiments, all of the bearing surfaces or only some of the bearing surfaces may be utilized for such support. For example, only the bearing surfaces 114, 116 between the rotor 102 and the axle 106 may be utilized, only the bearing surfaces 118, 120 between the rotor 102 and the housing 112 may be utilized, or a combination of all of the axially-aligned bearing surfaces 114, 116, 118, 120.

Regardless of the selected bearing surfaces 114, 116, 118, 120, such surfaces are designed to enhance the pressurization of a fluid in a gap or opening defined by (e.g., defined between) the bearing surfaces 114, 116, 118, 120 in order to provide a hydrodynamic bearing capable of at least partially withstanding the forces applied during the relative movement of the components.

As discussed above, one or more of the axially-aligned bearing surfaces 114, 116, 118, 120 may include surface features that enhance the hydrodynamic bearing that is formed between the respective axially-aligned bearing surfaces 114, 116, 118, 120 (e.g., by providing pockets of increased pressure in the fluid in order to support the movable element, such as the rotor 102). For example, one or more of the axially-aligned bearing surfaces 114, 116, 118, 120 may include a surface topography (e.g., non-planar, recessed, irregular, pocketed, and/or discontinuous surface features). Such topographical features may act to create pressure differentials along the surface, with areas or volumes of high pressure that assist in supporting the rotor 102 during rotation.

The axially-aligned bearing surfaces 114, 116, 118, 120 may each comprise arcuate surface (e.g., at least partially or entirely cylindrical, annular, or other curved surfaces). Respective pairs of the axially-aligned bearing surfaces 114, 116, 118, 120, as selected for a given embodiment, may be complementary to one another to provide an interface with a selected gap in which a fluid is disposed in order to define the hydrodynamic bearing.

In some embodiments, a majority of the forces from the rotor 102 may be borne by the axle 106, a majority of the forces from the rotor 102 may be borne by the housing 112 (e.g., where the device 100 may even lack an inner axle 106), or by both of the housing 112 and the axle 106.

In some embodiments, radially aligned bearing surfaces of the pressure exchange device 100 (e.g., surfaces aligned along a radially extending opening) may be configured to provide a hydraulic bearing similar to that discussed above. In particular, such bearing surfaces may enable the use of a relatively small axial gap between the radially aligned components where the enhancing bearing surfaces create a hydrodynamic bearing capable of more reliably managing axial movement between the radially aligned components. For example, a bearing surface 122 of each of the end covers 104 (e.g., an inwardly facing axial face of each of the end covers 104) may support an opposing bearing surface 124 of the rotor 102 (e.g., outwardly facing axial faces of the rotor 102).

As above, one or more of the radially aligned bearing surfaces 122, 124 may include surface features that enhance the hydrodynamic bearing that is formed between the respective radially aligned bearing surfaces 122, 124 (e.g., by providing pockets of increased pressure in the fluid in order to support the movable element, such as the rotor 102). For example, one or more of the radially aligned bearing surfaces 122, 124 may include a surface topography (e.g., non-planar, recessed, irregular, pocketed, and/or discontinuous surface features). Such topographical features may act to create pressure differentials along the surface, with areas or volumes of high pressure that assist in supporting the rotor 102 during rotation.

Figure 2:
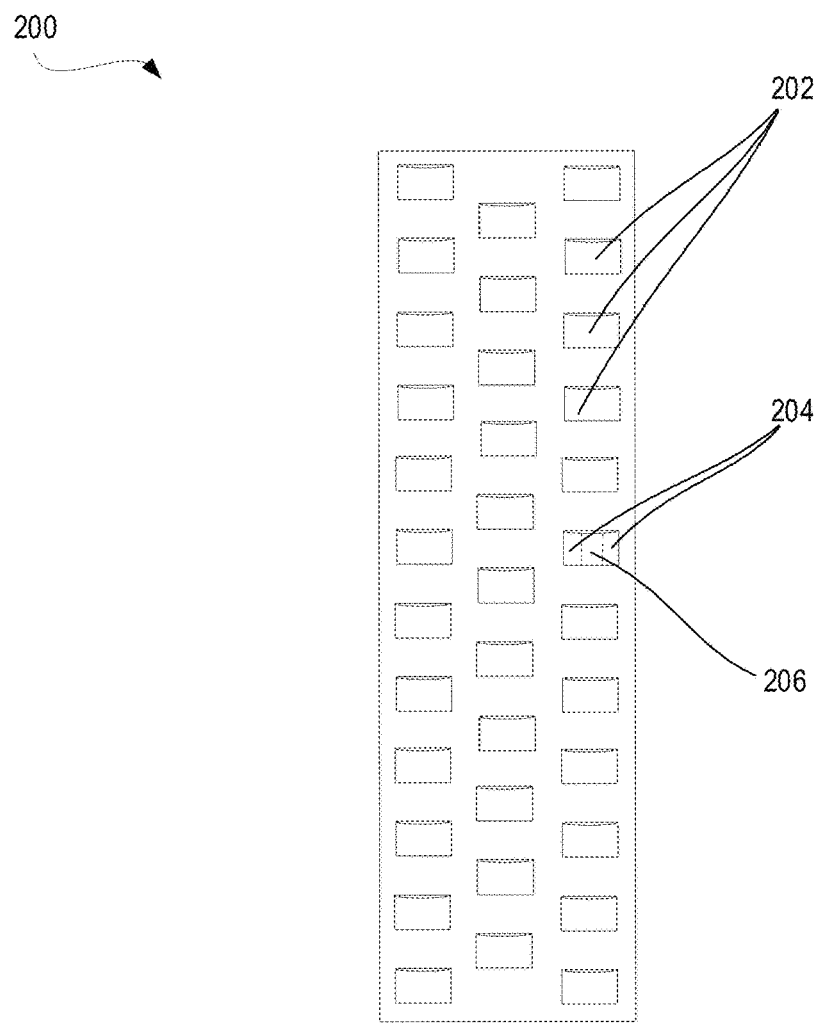
FIG. 2 is a plan view of a portion of a face of a bearing surface having topographical features according to an embodiment of the present disclosure.

FIG. 2 is a plan view of a portion of a face of a bearing surface 200 having topographical features. In some embodiments, the bearing surface 200 may comprise a portion of one or more of the axially-aligned bearing surfaces 114, 116, 118, 120 and/or the radially aligned bearing surfaces 122, 124 discussed above in relation to FIG. 1. In the instance of an axially-aligned bearing surfaces, it will be understood that the depicted bearing surface is simplified and/or flattened representation of a concave or convex surface, such as a partially or entirely cylindrical surface of the inner portion of the rotor 102 or the outer portion of the axle 106 as shown in FIG. 1.

As shown in FIG. 2, the bearing surface 200 includes recesses 202 (e.g., indents, channels, voids, openings, dimples, etc.) defined in the bearing surface 200. As depicted, the recesses 202 may be spaced in a repeating pattern on the bearing surface (e.g., with offset rows of spaced recesses 202 as shown).

As above, one or more of the recesses 202 may include one or more tapered surfaces 204 (e.g., ramps) extending into and/or out of the recesses 202. In some embodiments, the tapered surfaces 204 may define concave ramps on two opposing ends of the recesses 202. For example, the recesses 202 may be similar to that disclosed in U.S. Pat. No. 9,383,017, the disclosure of which is incorporated herein in its entirety by reference.

In some embodiments, the tapered surfaces 204 may define smooth ramps both into and back out of the recesses 202 at upstream and downstream locations of the recesses 202. In some embodiments, the tapered surfaces 204 may be provided only in the downstream direction (e.g., toward a fluid exit) of the recesses 202 in order to gradually pressurize the fluid as it is forced from the recesses 202.

In some embodiments, the one or more tapered surfaces 204 of the recesses 202 may be aligned in a direction of motion between the relatively movable element (e.g., the rotor and the axle 106). For example, each of the one or more tapered surfaces 204 (e.g., a centerline of the recesses 202) may lie in (e.g., substantially aligned with) an intended direction of rotation of the rotor 102. Stated in another way, during rotation, a point on one of the surfaces of the rotor 102 or the axle 106 would first cross over a first upstream tapered surface 204 leading into a lower portion 206 (e.g., lowest or deepest portion) of the recess 202 and then would cross over a second downstream tapered surface 204 leading back out of the lower portion 206 of the recess 202.

In additional embodiments, the centerline of the recesses 202 and/or the tapered surfaces 204 may be offset from the direction of rotation (e.g., positioned transverse to the intended direction of rotation). For example, the offset of the centerline of the recesses 202 and/or the tapered surfaces 204 may assist in directing fluid flow in the opening defined between the rotor 102 and the axle 106 (e.g., to provide a pumping function, which may act to direct the fluid in an axial direction about the axle 106).

Figure 3:
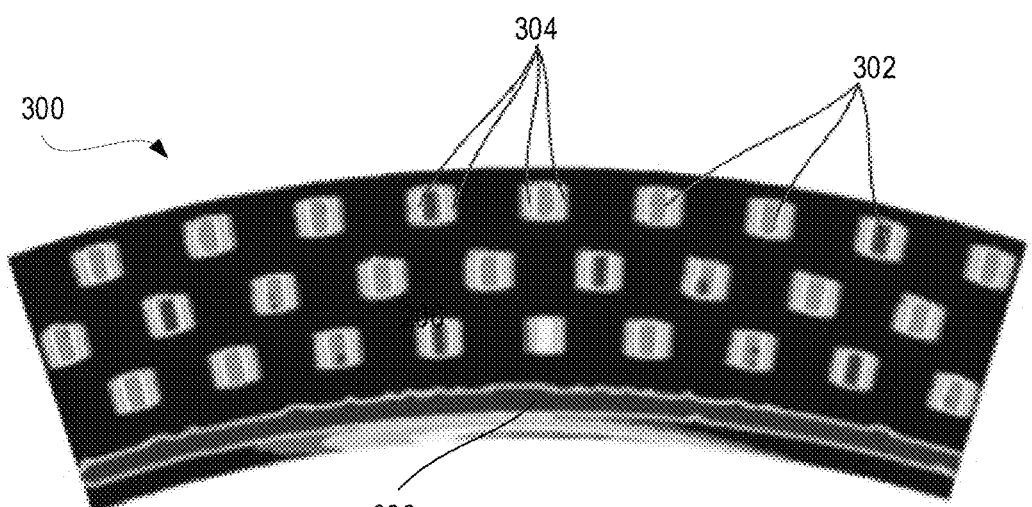
FIG. 3 is a plan view of a portion of a face of a bearing surface having topographical features according to an embodiment of the present disclosure.

In some embodiments, in addition to, or alternate from, the recesses 202, a relatively longer channel (e.g., channel 306 as shown in FIG. 3) may be defined in the bearing surface 200 in order to enhance the pumping effects of the bearing surface 200 in one or more selected directions. In some embodiments, the topographical features may include a plurality of such channel along or in combination with the recesses 202.

FIG. 3 is a plan view of a portion of a face of a bearing surface 300 having topographical features (e.g., microfeatures exhibiting one or more dimension on the scale of microinches or microns). In some embodiments, the bearing surface 300 may comprise a portion of one or more of the radially aligned bearing surfaces 122, 124 discussed above in relation to FIG. 1. As depicted, the bearing surface 300 may be defined on an axial face and may include recesses 302, each with tapered surfaces 304, where the recesses 302 may be curved to align with a direction of rotation about a diameter of the pressure exchange device 100 (e.g., arcuate recesses 302).

In addition to recesses 302, the bearing surface 300 may include channel 306 having an arcuate shape. For example, the arcuate channel 306 may extend along a direction of rotation of the rotor 102. The channel 306 may provide a pumping action as the channel 306 enables fluid to be drawn into the channel 306 and then spread and dispersed about the annular interface between the rotor 102 and the end covers 104.

Figure 4:
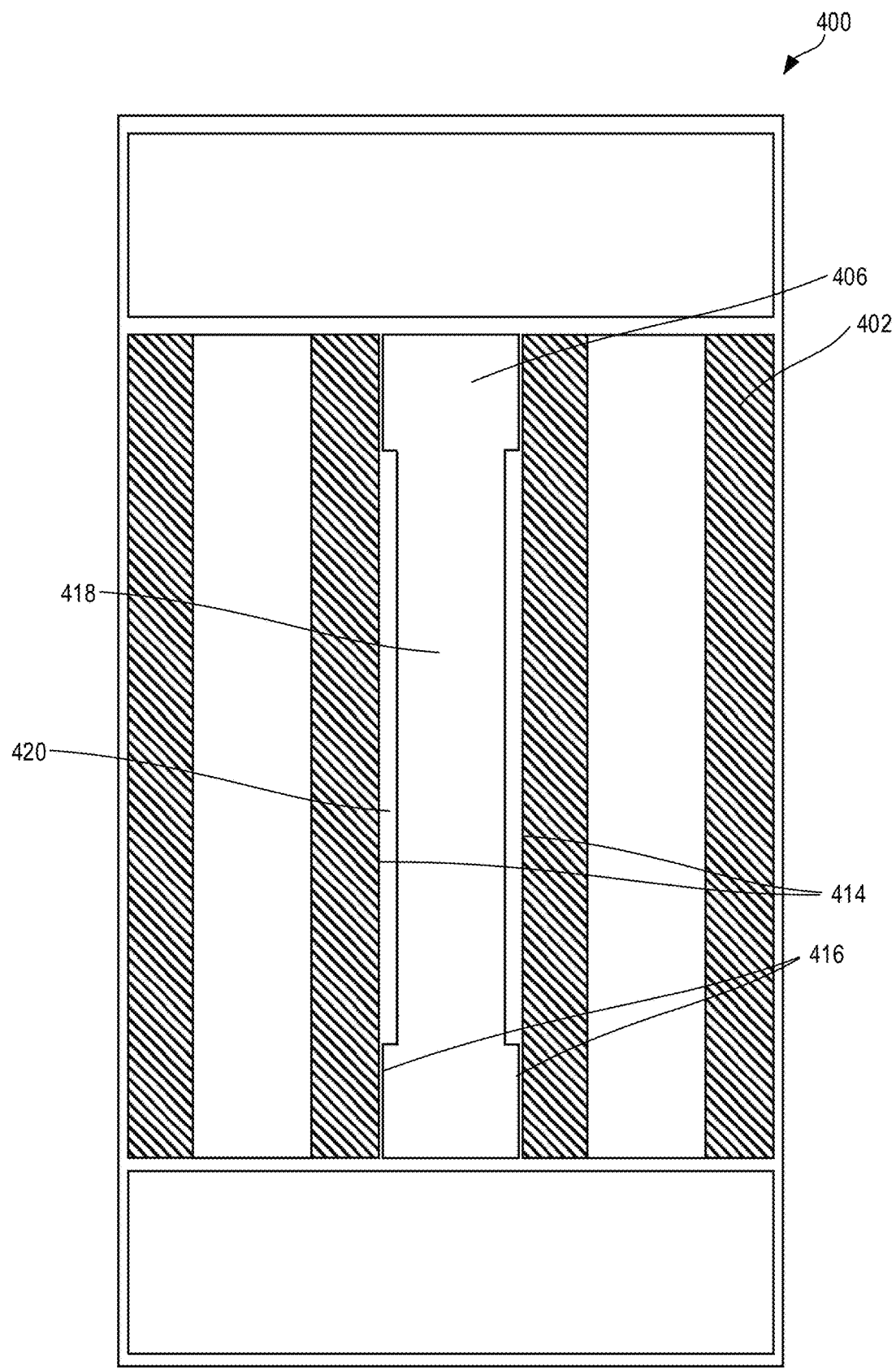
FIG. 4 is a simplified cross-sectional view of a pressure exchanger in accordance with an embodiment of the disclosure.

FIG. 4 is a simplified cross-sectional view of a pressure exchanger 400, which may be similar to and include similar components of other pressure exchangers disclosed herein. As shown in FIG. 4, an interface between one or more of the bearing surfaces (e.g., axially extending bearing surfaces 414, 416) may include a reduced overall surface area. For example, an outer portion of axle 406 (e.g., a reduced diameter portion 418) may define an opening (e.g., annular recess 420) separating a portion of the axle 406 from a portion of the rotor 402.

As depicted, only a portion (e.g., a minor annular portion) of the bearing surface 416 of the axle 406 will contact the adjacent bearing surface 414 of the rotor 402 as the rotor 402 rotates about the axle 406. In some embodiments, the reduced diameter portion 418 of the axle 406 may be at a central portion of the axle 406 with the bearing surfaces 416 positioned at opposing axial end portions of the axle 406 in contact with the bearing surfaces 414 of the rotor 402. In additional embodiments, the reduced diameter portion 418 may define multiple openings, for example, at opposing axial end portions with the bearing surface 416 extending between the multiple openings.

Figure 5:
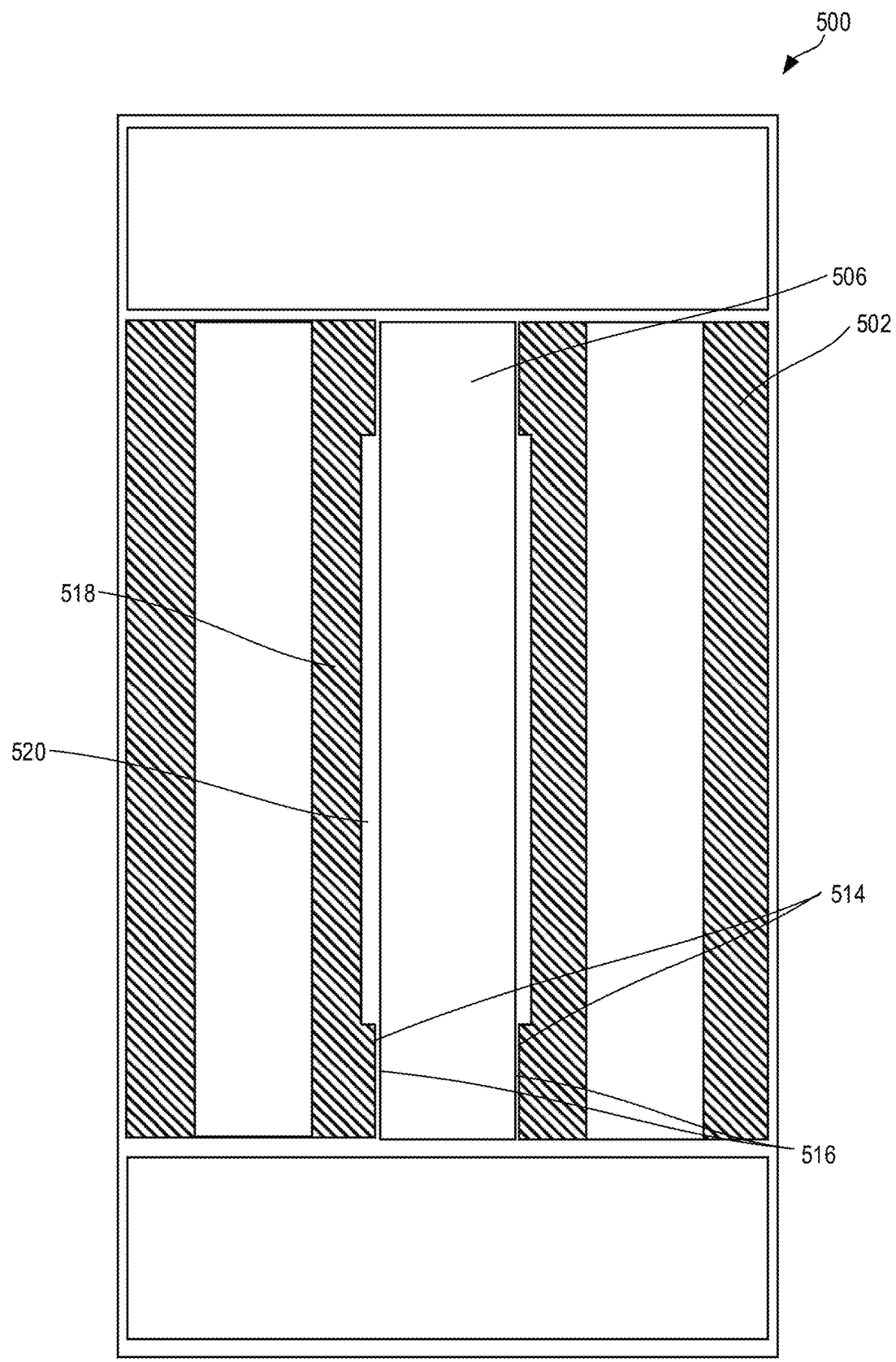
FIG. 5 is a simplified cross-sectional view of a pressure exchanger in accordance with an embodiment of the disclosure.

FIG. 5 is a simplified cross-sectional view of a pressure exchanger 500, which may be similar to and include similar components of other pressure exchangers disclosed herein. As shown in FIG. 5, an inner portion of rotor 502 (e.g., a reduced diameter portion 518) may define an opening (e.g., an annular recess 520) separating a portion of the axle 506 from a portion of the rotor 502.

As depicted, only a portion (e.g., a minor annular portion) of the bearing surface 514 of the rotor 502 will contact the adjacent bearing surface 516 of the axle 506 as the rotor 502 rotates about the axle 506. In some embodiments, the reduced diameter portion 518 of the rotor 502 may be at a central portion of the rotor 502 with the bearing surfaces 514 positioned at opposing axial end portions of the rotor 502 in contact with the bearing surfaces 516 of the axle 506. In additional embodiments, the reduced diameter portion 518 may define multiple openings, for example, at opposing axial end portions with the bearing surface 514 extending between the multiple openings.

In some embodiments, as a combination of the devices 400, 500 in FIGS. 4 and 5, one combined opening may be collectively defined by the recesses 420, 520 on each of the axle 506 and the rotor 502.

Figure 6:
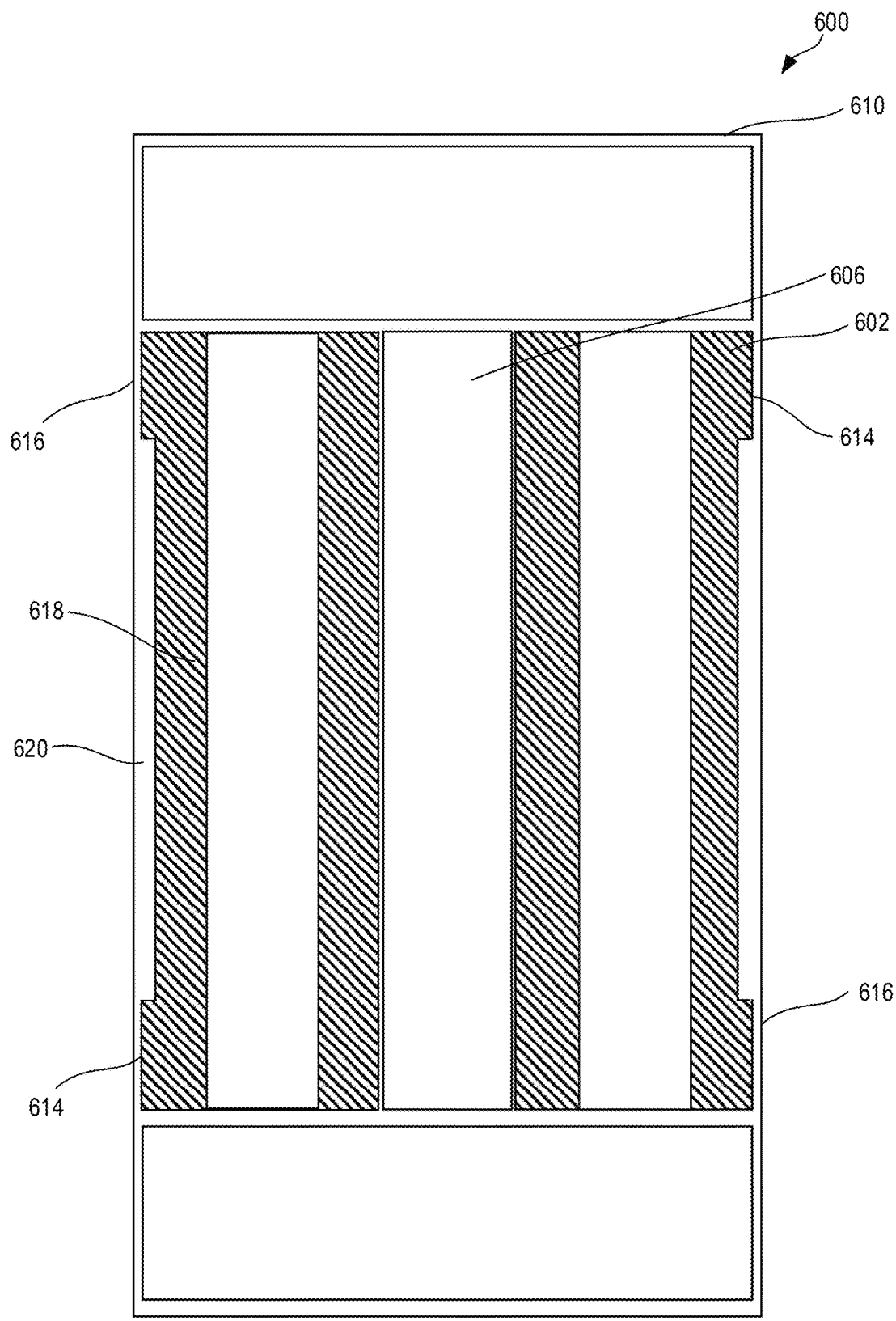
FIG. 6 is a simplified cross-sectional view of a pressure exchanger in accordance with an embodiment of the disclosure.

FIG. 6 is a simplified cross-sectional view of a pressure exchange device 600, which may be similar to and include similar components of other pressure exchangers disclosed herein. As shown in FIG. 6, an outer portion of rotor 602 (e.g., a reduced diameter portion 618) may define an opening (e.g., an annular recess 620) separating a portion of housing 610 from an outer portion of the rotor 602. In some embodiments, the pressure exchange device 600 may include an inner axle 606.

As depicted, only a portion (e.g., a minor annular portion) of the bearing surface 614 of the rotor 602 will contact the adjacent bearing surfaces 616 of the housing 610 as the rotor 602 rotates within the housing 610. In some embodiments, the reduced diameter portion 618 of the rotor 602 may be at a central portion of the rotor 602 with the bearing surfaces 614 positioned at opposing axial end portions of the rotor 602 in contact with the bearing surfaces 616 of the housing 610. In additional embodiments, the reduced diameter portion 618 may define multiple openings, for example, at opposing axial end portions with the bearing surface 614 extending between the multiple openings.

Figure 7:
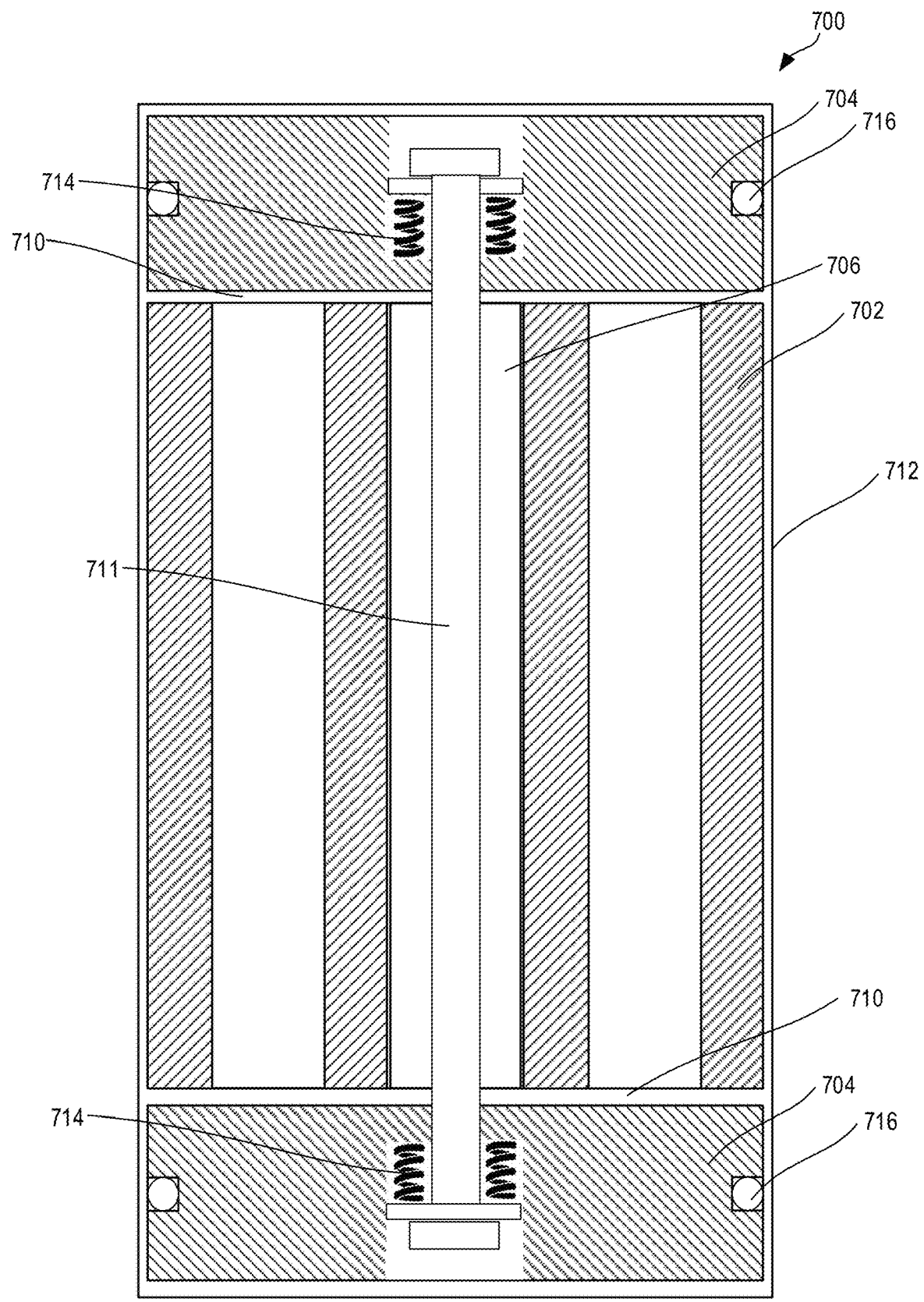
FIG. 7 is a simplified cross-sectional view of a pressure exchanger including movable end covers in accordance with an embodiment of the disclosure.

FIG. 7 is a simplified cross-sectional view of a pressure exchanger 700 including movable end covers 704. The pressure exchanger 700 may be similar to and include the similar components of other pressure exchangers disclosed herein.

As shown in FIG. 7, end covers 704 may be mounted to the axle 706 in a movable manner to enable the end covers 704 to move axially away from rotor 702 during rotation of the rotor 702. For example, forces applied to the end covers 704 (e.g., through the forming of bearings in openings or gaps 710 between the rotor 702 and the end covers 704, in the manners discussed above) may displace the end covers 704 in the axial direction away from the rotor 702.

In some embodiments, the end covers 704 may be biased (e.g., with springs 714 coupled to the axle 706 with one or more central rods 711) in a direction toward the rotor 702. The forces generated by movement of the rotor 702 and the movement of fluid in the openings 710 may overcome the biasing force of the springs 714 so that the end covers 704 may move away from the rotor 702. As depicted, the spring 714 may be contained between a portion of the rod 711 (e.g., a washer on the rod 711) and a portion of the end cover 704 such that movement of the end cover 704 compresses the spring 714 into the washer of the rod 711.

In some embodiments, one or more seals (e.g., one or more O-rings 716) may be defined between the end covers 704 and an adjacent structure (e.g., the housing 712) in order at least partially prevent fluid to flow around the end covers 704 that are movable relative to the housing 712.

As discussed above, embodiments of the present disclosure may provide bearing surfaces with topographical features that enhances the ability of an associated device to support loads (e.g., rotational loads) between respectively moving parts of the device. Such topographical features may collectively provide a relatively large pressure in a gap filled with fluid in order to create a relatively larger supporting force for the bearing surface in a relatively shorter overall surface area. Such a configuration may be especially useful where a relatively long bearing span may be difficult to maintain, such as in a small bore or along a large axial distance between the rotor and housing and/or axle of a pressure exchanger. Such a configuration may also be especially useful with complementary annular or otherwise curved element (e.g., complementary cylindrical elements). Topographical features on the complementary annual elements may act to support the elements (e.g., around or about axially extending sides of one or more of the elements) in order to substantially center the one or more of the elements during relative movement (e.g., rotation) and at least partially prevent the relatively moving elements from inadvertently contacting each other causing damage to and/or binding of the components.

Bearing surfaces with such topographical features may enhance the ability to maintain a relatively small gap between relatively moving elements while also providing enough pressure and spacing to prevent contact and wear between the elements. For example, embodiments of the disclosure may create high-pressure pockets to minimize or even prevent contact, while still controlling leakage using a relatively small axial gap.

In some embodiments, the topography may provide a pumping action to circulate fluid between the bearing surfaces.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A device for exchanging pressure between at least two fluid streams, the device comprising:
   a rotor comprising fluid channels;
   one or more end covers positioned at one or more axial ends of the rotor, a fluid inlet and a fluid outlet defined in the one or more end covers to provide fluid into or out of the fluid channels;
   a housing radially encompassing at least the rotor, the rotor configured to rotate relative to at least one of an axle in the housing about which the rotor is disposed or the housing; and
   bearing surfaces defined by the rotor and one or more radially-extending surfaces of the one or more end covers, at least one of the bearing surfaces comprising a varying topography including one or more discrete recesses for holding pressurized fluid in order to create a hydraulic bearing to support the rotor as the rotor moves relative to the one or more end covers, wherein the one or more end covers are configured to move axially away from the rotor to increase an axial dimension of openings between the rotor and the one or more end covers in response to the hydraulic bearing created by movement of the rotor.

2. The device of claim 1, wherein the one or more discrete recesses define one of a hydrostatic bearing or a hydrodynamic bearing.

3. The device of claim 1, wherein the one or more discrete recesses comprise micro-recesses each having a depth of less than 0.001 inch (0.0254 millimeter), the micro-recesses to provide a pressure drop and a pressure increase as the fluid moves through the micro-recesses.

4. The device of claim 1, wherein the one or more discrete recesses comprise a single recess.

5. The device of claim 1, wherein the device is configured to define a radial bearing between an axially extending surface of the rotor and the axially extending surface of the axle.

6. The device of claim 1, wherein the device is configured to define a radial bearing between an axially extending surface of the rotor and the axially extending surface of the housing.

7. The device of claim 1, wherein the device is configured to define axial bearings between radially-extending surfaces of the rotor and the one or more radially-extending surfaces of the one or more end covers.

8. The device of claim 7, wherein one or more of the radially-extending surfaces of the rotor and/or the one or more end covers comprises yet additional varying topography configured to provide a pumping feature along the radially-extending surfaces of the rotor to control movement of the fluid between the rotor and the one or more end covers.

9. The device of claim 1, wherein the one or more end covers are coupled to the axle with at least one degree of freedom in order to slide axially away from the rotor along the axle.

10. The device of claim 1, wherein the one or more end covers are biased in an initial position.

11. The device of claim 1, further comprising a channel for at least one of carrying a load generated by rotation of the rotor or supplying the fluid between the bearing surfaces of the device to control flow of the fluid in between the bearing surfaces.

12. The device of claim 1, wherein at least one of the rotor or the axle comprises an annular recess positioned at one or more of an inner diameter of the rotor adjacent to the axle or at an outer portion of the rotor.

13. A device including hydraulic bearings, the device comprising:
   a first element comprising a stator;
   a second element comprising a rotor being movable relative to the first element, the first element and the second element defining a gap between the first element and the second element, the gap configured to receive a fluid in the gap when the second element is being moved relative to the first element;
   bearing surfaces defined by the first element and the second element on opposing sides of the gap, at least one of the bearing surfaces comprising a varying topography of one or more blind recesses to provide pressurized volumes of the fluid in order to define a hydraulic bearing to support at least one of the first element or the second element as the second element is being moved relative to the first element, wherein the bearing surfaces comprise both complementary cylindrical surfaces defining a radial bearing and substantially planar surfaces defining an axial bearing; and at least one channel defined in at least one of the bearing surfaces along an interface between at least two of the bearing surfaces, the at least one channel extending along each of the one or more blind recesses, the at least one channel for supplying the fluid between the at least two of the bearing surfaces of the device to enhance flow of the fluid in between the at least two of the bearing surfaces.

14. The device of claim 13, wherein the one or more recesses comprise micro-recesses having a depth of less than 0.001 inch (0.0254 millimeter).

15. The device of claim 13, wherein the radial bearing is defined between the first element including at least one end cap axially bordering the second element.

16. A method of forming a hydraulic bearing, the method comprising:

rotating a rotor about an axis of a device;

directing a fluid into an interface between the rotor and another component of the device;

displacing bearing surfaces at the interface relative to one another, the bearing surfaces defined by the rotor and at least one of an axially-extending surface of the another component or a radially-extending surface of the another component;

supplying the fluid in the interface to at least one of the bearing surfaces comprising a varying topography of one or more micro-recesses in order to define a hydraulic bearing to support the rotor; and flowing at least some of the fluid to a channel defined along the interface between the bearing surfaces, the channel extending along an entirety of the one or more micro-recesses, the channel being defined in at least one of the bearing surfaces and configured to enhance pumping of the fluid by drawing the fluid into a volume between the bearing surfaces defined by the channel.

17. The method of claim 16, further comprising flowing the fluid through the one or more micro-recesses having a depth of less than 0.001 inch (0.0254 millimeter).

18. The method of claim 16, further comprising defining at least one of a hydrodynamic bearing or a hydrostatic bearing with the varying topography of the one or more micro-recesses.

19. The method of claim 16, further comprising moving one or more end covers of the device axially away from the rotor to increase an axial dimension of openings between the rotor and the one or more end covers in response to the hydraulic bearing created by movement of the rotor.

20. The method of claim 16, further comprising defining a bearing surface of the bearing surfaces on an axle with only a portion of at least one of an outer circumference of the rotor or an inner circumference of the axle.

* * * * *